A. KINGSBURY.
THRUST BEARING.
APPLICATION FILED MAY 9, 1911.

1,117,500.

Patented Nov. 17, 1914.
2 SHEETS—SHEET 1.

WITNESSES:
Fred H Miller
B. B. Hines

INVENTOR
Albert Kingsbury
BY
ATTORNEY

A. KINGSBURY.
THRUST BEARING.
APPLICATION FILED MAY 9, 1911.
1,117,500.
Patented Nov. 17, 1914.
2 SHEETS—SHEET 2.
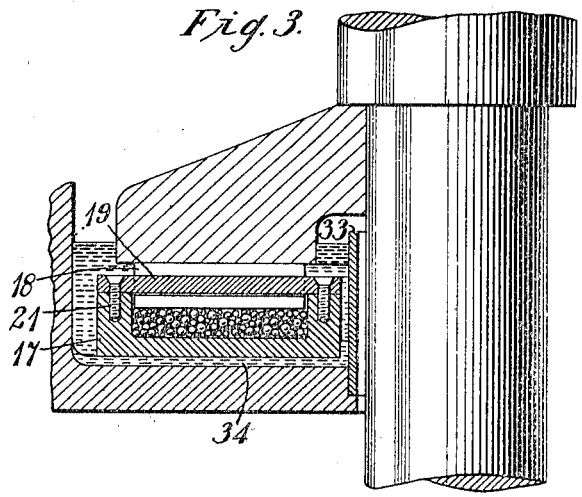
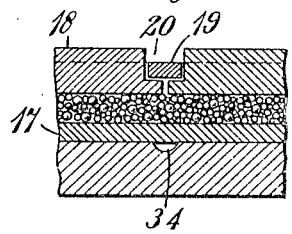
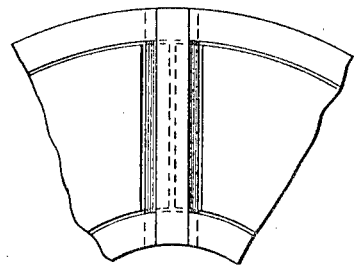
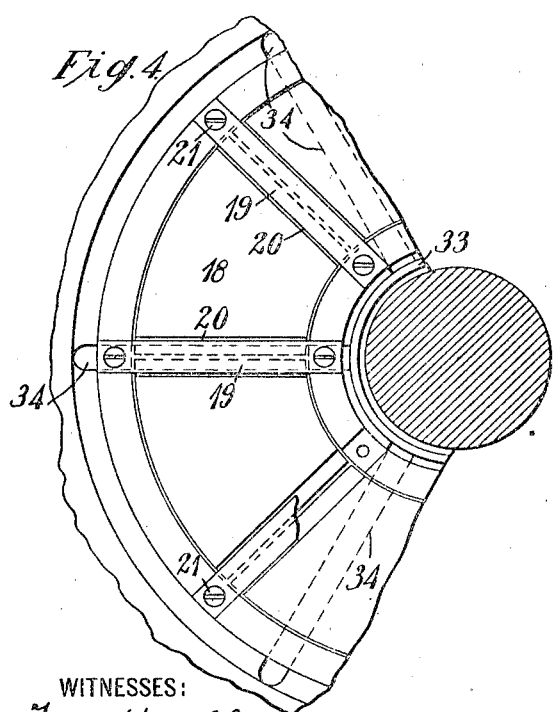
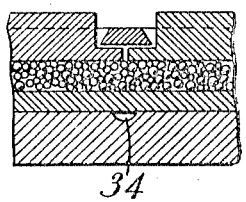
WITNESSES:
Fred H. Miller
B. B. Hines
INVENTOR
Albert Kingsbury
BY
ATTORNEY

UNITED STATES PATENT OFFICE.

ALBERT KINGSBURY, OF PITTSBURGH, PENNSYLVANIA.

THRUST-BEARING.

1,117,500. Specification of Letters Patent. Patented Nov. 17, 1914.

Application filed May 9, 1911. Serial No. 626,363.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Thrust-Bearings, of which the following is a specification.

My invention relates to thrust bearings which are adapted to sustain relatively high pressures between the contact surfaces, and it has special reference to bearings which comprise a plurality of radial shoes, so arranged that a film of lubricating fluid is automatically maintained between the bearing surfaces.

One object of my invention is to provide a bearing of the aforesaid class that shall be simple and durable in construction and that shall embody means for not only equalizing the thrust pressure upon the radial shoes of which the bearing is comprised but also for equally distributing the back pressure exerted on each shoe by its support, in order to avoid any tendency for the shoes to become distorted in operation.

In my co-pending application, Serial No. 604,715, filed January 26, 1911, I have shown and described a thrust bearing having the general characteristics above indicated and provided with means for equalizing the pressure on the several shoes. Each of the shoes, however, is supported, near its central portion, and consequently there is a tendency, when the bearing is called upon to withstand nigh pressures, for the corners of the shoes to bend downwardly, to a slight degree, instead of maintaining a perfectly plane bearing surface.

According to my present invention, I secure, in addition to the advantages set forth in my prior application, a distribution of supporting pressure which precludes the possibility of flexure or distortion and somewhat simplifies the structure of the shoes and the bearing.

I will describe my invention in the following specification and point out the novel features thereof in appended claims.

Figure 1:
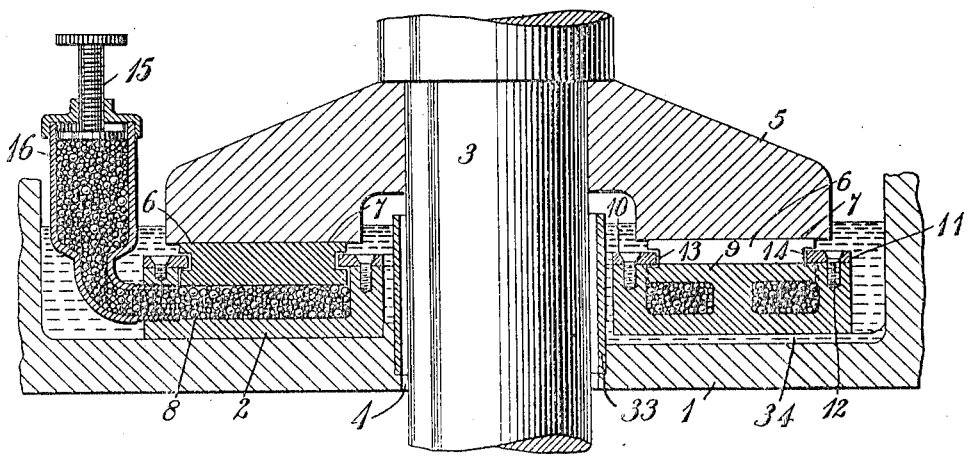
Figure 2:
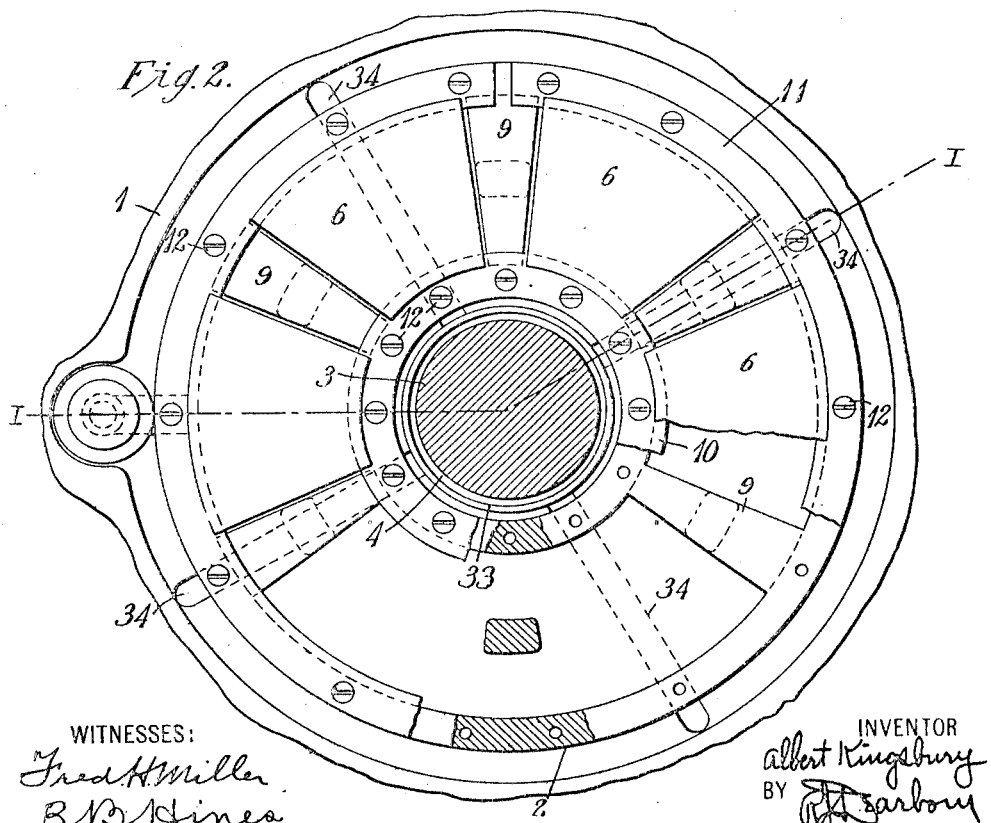

Figure 1 of the accompanying drawings, is a sectional elevation on the line I—I of Fig. 2, and Fig. 2 is a plan view, with certain of the parts removed, of a bearing constructed in accordance with my invention. Figs. 3 and 4 are fragmentary views corresponding to Figs. 1 and 2 of a modified structure embodying my invention, and Figs. 5, 6 and 7 are detail views of the structure shown in Figs. 3 and 4.

Referring to Figs. 1 and 2 of the drawings, the structure here shown comprises a relatively stationary support or base 1, an annular channel-shaped member 2 supported thereon, a rotatable shaft 3 which extends through a hole 4 in the base 1, a flange or collar 5 mounted on the shaft and a plurality of contact shoes 6 which are engaged by a contact surface 7 of the flange or collar 5.

The annular channel-shaped member 2 constitutes a receptacle or a series of communicating receptacles, containing, in the form illustrated in Figs. 1 and 2, a large number of small steel balls 8 which have the characteristics of a non-compressible fluid and on which the shoes 6 are supported. The shoes 6 are symmetrically arranged about the shaft 3 and are preferably spaced apart by bridge members 9 which prevent them from rotating, without interfering with a limited movement of the shoes along the channel or into and out of the receptacle or space, in which each is located.

The shoes together constitute a segmental ring, the segments of which are spaced apart by the bridge pieces 9 and are held loosely in position by means of rings 10 and 11. The rings are secured to the member 2 by means of screws 12 and extend into annular grooves 13 and 14 of the segmental ring comprising the shoes.

When large forces are applied through the shaft 3 and flange 5 to the outer surfaces of the shoes 6, the pressure is automatically equalized between them on account of the characteristics of the medium on which they are supported. Furthermore, the back pressure is equally distributed over the bottom surface of the shoes so that there is no tendency for them to become deflected or distorted. The shoes may be simultaneously adjusted to take up wear in the bearing surfaces by adjusting the screw plug 15 in the mouth of a pipe or column 16 which communicates with the receptacle constituted by the annular channel-shaped member 2 and is also filled with small steel balls.

While I have shown the channel shaped receptacle in which the shoes are supported, filled with steel balls of relatively small size, my invention is not restricted in this regard and solid members of various sizes and shapes or a single cushion of soft rubber or similar elastic material or of plastic material may be substituted within the spirit and scope of my invention, provided the mass is only very slightly compressible and at the same time will not flow through small cracks or openings. In other words, I do not wish to be limited to any particular material except that I desire to approximate the action of a non-compressible fluid without being confronted with the possibility of leakage and other disadvantages incident to the use of liquids.

The base 1 on which the member 2 is supported is hollow and is provided with a flange 33 so that it may contain oil or other suitable lubricating fluid. It is further provided with substantially radial grooves 34 in order to permit the oil to circulate from the middle of the hollow base outward through the bearing surfaces and return through the grooves.

Referring to Figs. 3, 4 and 5, the bearing here shown is similar to that of Figs. 1 and 2, except that a channel-shaped member 17, having no bridge pieces or other spacing members which correspond exactly to the members 9, is substituted for the member 2 and that shoes 18 are substituted for the shoes 6. The shoes 18 are so proportioned as to substantially fill the entire opening of the channel-shaped member 17, strips or spacers 19 being set in notches 20, cut in the upper surface of the shoes at their adjacent edges. The spacers 19 are secured to the walls of the channel-shaped members 17 by any suitable means, such as screws 21, but they are relatively light and inexpensive since the pressure which exists in the medium beneath the shoes is not transmitted to them at any point.

As shown in Figs. 6 and 7, the spacers may be dove-tailed into the walls of the channel-shaped member, rendering the use of screws unnecessary.

In operation the shoes will assume a slightly tilted position relative to the bearing surface of the collar with which they engage and will automatically maintain a film of oil between the bearing surfaces in accordance with the principles set forth in Patent No. 947,242 granted January 25, 1910 on an application filed by be May 20, 1907.

It will, of course, be understood that it is immaterial which part of the bearing rotates, and, in fact, either may constitute the rotating part or both may be rotatable. Consequently, I have referred to the members as relatively rotatable.

I claim as my invention:

1. A thrust bearing comprising a stationary member having an annular channel mounted thereon, a medium of small substantially non-compressible solid members in the channel, and a plurality of bearing shoes mounted loosely in the channel, and buoyed up by the medium of small solid members.

2. A bearing comprising a hollow receptacle, a substantially non-compressible yielding solid medium contained therein, a plurality of bearing members resting on the yielding solid medium and substantially filling the opening of the receptacle and a relatively movable bearing member coöperating with the first-named bearing members.

3. A thrust bearing comprising a stationary channel-shaped receptacle, a substantially non-compressible yielding medium of small solid members, partially filling the receptacle, a plurality of bearing shoes substantially filling the opening of the channel-shaped receptacle and resting on the small solid members, and a coöperating relatively movable bearing member adapted to engage the outer surfaces of the shoes.

4. A thrust bearing comprising a channel-shaped receptacle having bridge pieces which divide its opening into a series of smaller openings, a large number of small solid members disposed in the channel-shaped receptacle and constituting a yielding solid medium, pressure contact shoes fitted loosely into the several openings and resting on the small solid members and means for holding the shoes against removal and permitting a limited movement of the shoes into and out of the receptacle.

5. A thrust bearing comprising a receptacle, a large number of small solid members partially filling the receptacle and constituting a yielding medium, a plurality of shoes completely filling the opening in the receptacle and resting on the small members and means for limiting the outward movement of the shoes.

6. A bearing comprising a hollow receptacle containing solid matter constituting a substantially non-compressible yielding solid medium, contact pressure members resting on said medium and substantially filling the opening of the receptacle and a relatively movable coöperating pressure member engaging the outer surfaces of the first-named pressure members.

7. A thrust bearing comprising a relatively stationary member, an annular channel mounted thereon, a medium of steel balls contained in the annular channel and a plurality of contact shoes mounted loosely in the annular channel and buoyed up by the medium of steel balls.

8. A bearing comprising a hollow base or receptacle, a yielding medium of small steel balls disposed therein, bearing shoes mounted on the surface of the medium and means for limiting the movement of the bearing shoes independently of the base to a direction substantially at right angles to the surface of the medium.

9. A bearing comprising a hollow base or receptacle, a yielding medium of finely divided solid matter disposed therein, bearing shoes mounted on the surface of the medium and means for limiting the movement of the bearing shoes independently of the base to a direction substantially at right angles to the surface of the medium.

10. A thrust bearing comprising a stationary channel shaped receptacle, a substantially non-compressible yielding solid medium partially filling the receptacle, a plurality of contact shoes substantially filling the opening of the channel-shaped receptacle and resting on said medium, and a relatively movable bearing member adapted to coöperate with the shoes.

11. A thrust bearing comprising a channel-shaped receptacle having bridge pieces which divide its opening into a series of smaller openings, a substantially non-compressible yielding solid medium disposed in the channel-shaped receptacle, pressure contact shoes fitted loosely into the several openings and resting on said medium and means for holding the shoes against removal, arranged to permit a limited movement of the shoes into and out of the receptacle.

In testimony whereof, I have hereunto subscribed my name this 5th day of May 1911.

ALBERT KINGSBURY.

Witnesses:
R. J. DEARBORN,
B. B. HINES.